United States Patent
Modjeski et al.

(10) Patent No.: US 7,254,568 B2
(45) Date of Patent: Aug. 7, 2007

(54) TESTING A DATABASE CONNECTION

(75) Inventors: Melissa Sue Modjeski, Kellogg, MN (US); Har Mohan Puri, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/821,214

(22) Filed: Apr. 8, 2004

(65) Prior Publication Data

US 2005/0228810 A1 Oct. 13, 2005

(51) Int. Cl.
*G06F 7/00* (2006.01)
*G06F 17/30* (2006.01)

(52) U.S. Cl. .............................. 707/1; 707/2
(58) Field of Classification Search ............ 707/1, 707/2, 3, 6, 7
See application file for complete search history.

(56) References Cited

U.S. PATENT DOCUMENTS

2003/0195765 A1* 10/2003 Sehgal et al. ................ 705/1
2005/0216781 A1* 9/2005 Doshi et al. ................ 714/2

OTHER PUBLICATIONS

Sadtler et al ("IBM WebSphere Application Server V5.0 System Management and Configuration: WebSphere Handbook Series") published on Apr. 17, 2003 by IBM http://proquest.safaribooksonline.com/073842661X/ch15lev1sec7.*
JMX4ODP Manual (Junit Diagnostic Workers), http://jmx4odp.sourceforge.net/manual/junitDiagWrk_desc.html, Sep. 16, 2003, pp. 1-11.

* cited by examiner

*Primary Examiner*—Sam Rimell
*Assistant Examiner*—Jared Bibbee
(74) *Attorney, Agent, or Firm*—Owen J. Gamon

(57) ABSTRACT

A method, apparatus, system, and signal-bearing medium that in an embodiment receive a scope level, find datasource configuration data based on the scope level, find an environment variable based on the scope data, and load a database driver based on the datasource configuration data and the environment variable. A connection to a database server is attempted via the database driver. If the connection is successful, success is reported. If the connection fails, failure is reported. In this way, a connection to a database server may be tested without needing to write and deploy an application.

19 Claims, 4 Drawing Sheets

TESTING A DATABASE CONNECTION

FIELD

An embodiment of the invention generally relates to computers. More particularly, an embodiment of the invention relates to testing a database connection in a distributed environment.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs.

Years ago, computers were stand-alone devices, and all the data that a user needed was stored on the single computer. But today, computers are increasingly connected in networks, and data may be distributed across multiple computers, and each of these computers may have independent subsystems. For example, a web commerce site may have several distributed web servers, application servers, transaction servers, and database servers, and these servers may run on different platforms using different operating systems running on different hardware.

The Enterprise JavaBeans (EJB) component architecture is designed to enable enterprises to build distributed, multi-platform, applications as reusable, server-side components. Its purpose is to solve the enterprise problems by allowing the enterprise developer to focus only on writing business logic instead of focusing on the problems of distributed data and multiple platforms. The Enterprise Java Beans specification creates an infrastructure that handles the system-level programming, such as transactions, security, threading, naming, object-life cycle, resource pooling, remote access, and persistence. EJB also simplifies access to existing applications, and provides a uniform application development model for tool creation use using object-oriented programming techniques.

Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Java is an object-oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. These bytecodes are executed by a Java interpreter. A Java interpreter is a module in the JVM that alternately decodes and executes a bytecode or bytecodes.

A Java bean is a reusable component in a Java application that may be executed using the Java interpreter. Various programs in Java may be created by aggregating different Java beans. Some examples of business objects are customers, orders, and products. In the J2EE (Java 2 Platform Enterprise Edition) SDK (Software Development Kit), the persistent storage mechanism is a relational database. Typically, each entity bean has an underlying table in a relational database, and each instance of the bean corresponds to a row in that table.

A distributed J2EE application uses a datasource to access a database. Configuration of the datasource is error prone since it involves input of parameters from the user. If the datasource is configured on multiple machines or servers, as is common in a distributed environment, checking the validity of the datasource is not possible until the application has been written, deployed, and a test run attempted.

Without a better way to test a database connection, users will be unable to enjoy the full advantages of distributed data. Although the aforementioned problems have been described in the context of the Enterprise Java Bean specification, they can occur in any environment.

SUMMARY

A method, apparatus, system, and signal-bearing medium are provided that in an embodiment receive a scope level, find datasource configuration data based on the scope level, find an environment variable based on the scope data, and load a database driver based on the datasource configuration data and the environment variable. A connection to a database server is attempted via the database driver. If the connection is successful, success is reported. If the connection fails, failure is reported. In this way, a connection to a database server may be tested without needing to write and deploy an application.

DETAILED DESCRIPTION

Figure 1:
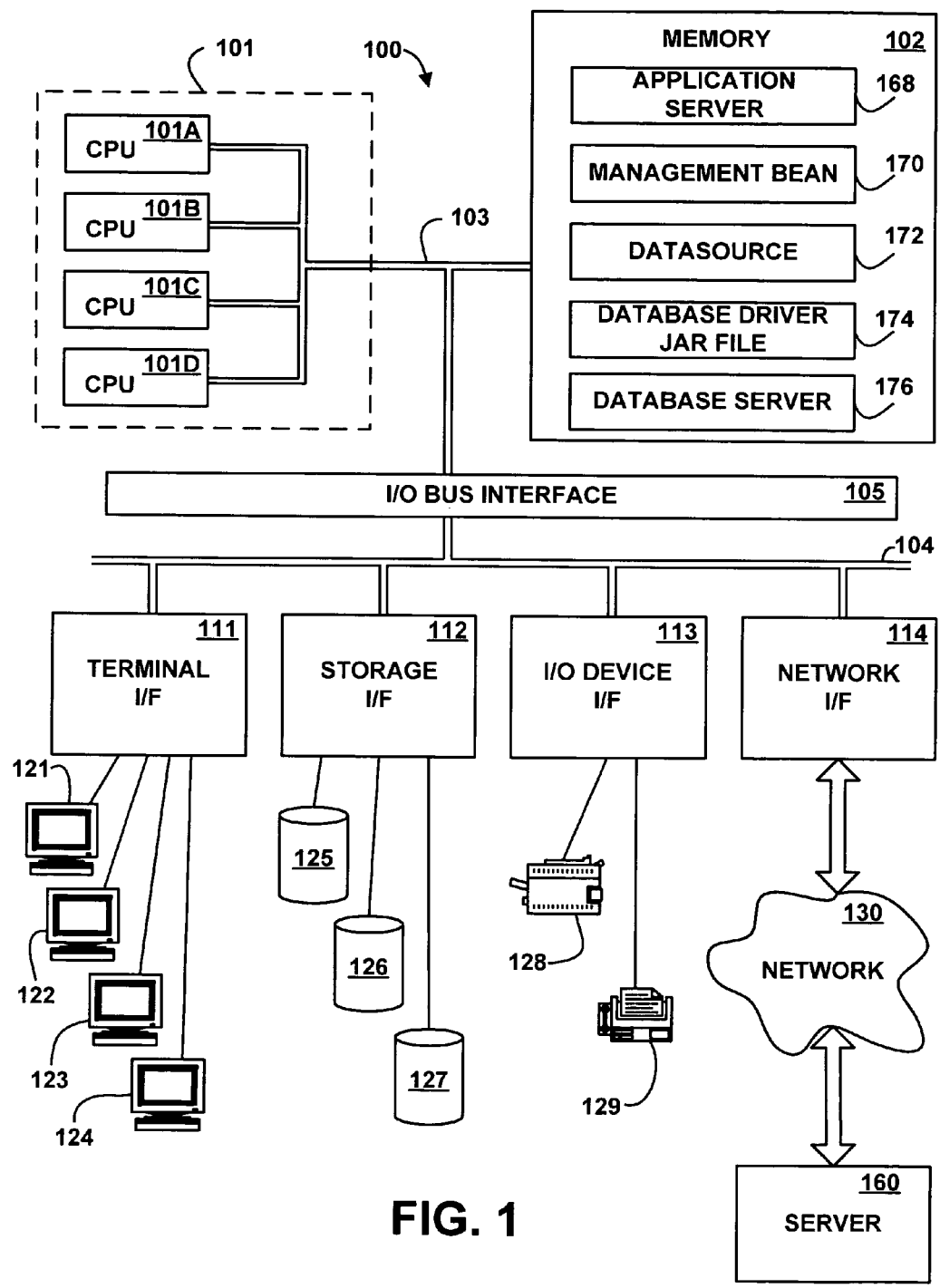
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes an application server 168, a management bean 170, a datasource 172, a database driver jar file 174, and a database server 176. Although the application server 168, the management bean 170, the datasource 172, the database driver jar file 174, and the database server 176 are illustrated as being contained within the memory 102 in the computer system 100, in other embodiments some or all of them may be on different computer systems (e.g., the server 160) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the application server 168, the management bean 170, the datasource 172, the database driver jar file 174, and the database server 176 are illustrated as residing in the memory 102, these elements are not necessarily all completely contained in the same storage device at the same time. Further, although the application server 168, the management bean 170, the datasource 172, the database driver jar file 174, and the database server 176 are represented as being software and data elements stored in the memory 102, in other embodiments some or all of them may include hardware elements or may represent an entire computer, e.g., the server 160.

The application server 168 represents an application that desires to establish a connection to the database server 176. In an embodiment, the application server 168 may be implemented via the WebSphere Application Server, but in other embodiments, any appropriate server may be used.

The management bean 170 tests the connection to the database server 176. In an embodiment, the management bean 170 includes instructions capable of executing on the processor 101 or statements capable of being interpreted by instructions executing on the processor 101 to perform the functions as further described below with reference to FIG. 4. In another embodiment, the management bean 170 may be implemented in microcode. In yet another embodiment, the management bean 170 may be implemented in hardware via logic gates and/or other appropriate hardware techniques, in lieu of or in addition to a processor-based system.

The datasource 172 is defined in the scope of a cell, node, or server. The database driver jar file 174 is used by the datasource 172 to access the database server 176. A jar file (Java Archive file) is a file that contains various applet components gathered into a single file and compressed for faster downloading. In an embodiment, the database driver jar file 174 may be a JDBC (Java Database Connectivity) driver, but in other embodiments, any appropriate driver may be used and a zip file, class file, or any other appropriate type of file format may be used instead of a jar file. The database server 176 may include data in the form of a database (whether relational or non-relational) and method components for accessing the database.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the direct access storage devices 125, 126, and 127 may be loaded and stored to the memory 102 as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server 160. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The server 160 is an electronic device and may include elements analogous to some or all of the elements previously described above for the computer system 100. Although only one server 160 is illustrated, any number of servers may be present.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
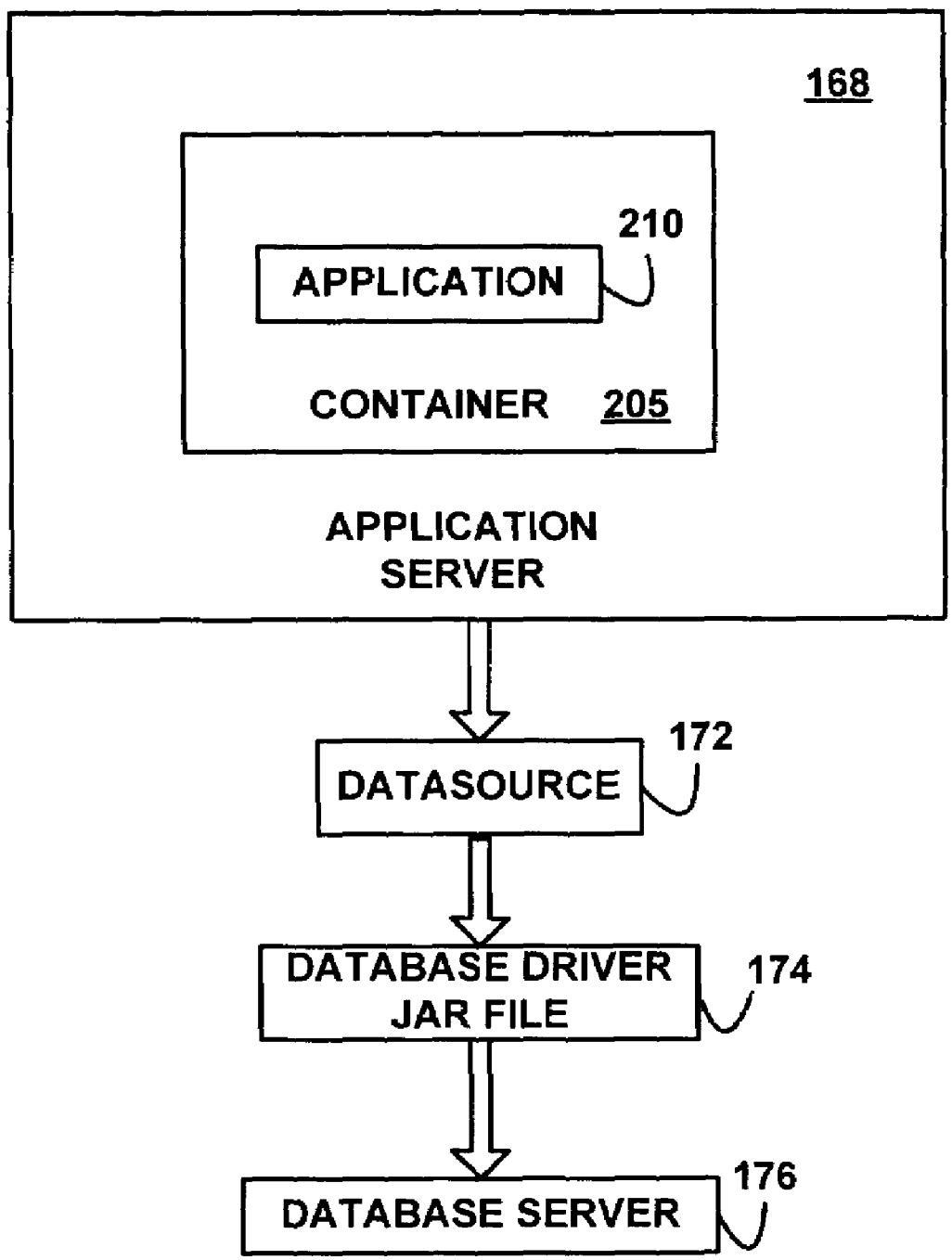
FIG. 2 depicts a block diagram showing the relationship of select components of the example system, according to an embodiment of the invention.

FIG. 2 depicts a block diagram showing the relationship of select components of the example system of FIG. 1, according to an embodiment of the invention. The application server 168 includes a container 205, which contains an application 210. In an embodiment, the application server 168 may be implemented via the WebSphere Application server available from IBM Corporation of Armonk, N.Y., but in other embodiments any appropriate application server may be used. The container 205 is an entity that provides life-cycle management, security, deployment, and runtime services to the components that it contains, which in this example is the application 210. In an embodiment, the application 210 is a distributed J2EE (Java 2 Platform Enterprise Edition) application, but in other embodiments any appropriate application may be used. The application 210 uses the datasource 172 to access the database server 176 via the database driver jar file 174.

Figure 3:
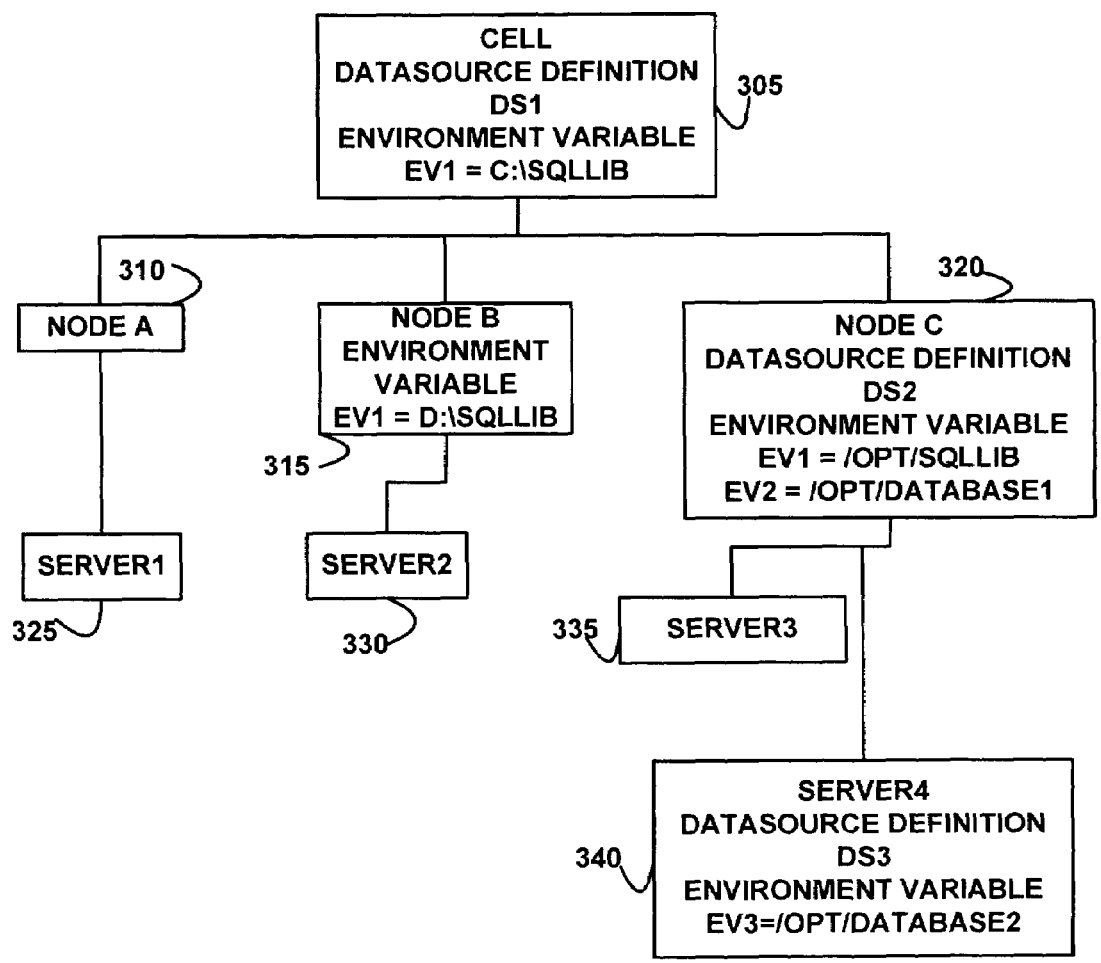
FIG. 3 depicts a block diagram of an example configuration of a cell, nodes, and servers, according to an embodiment of the invention.

FIG. 3 depicts a block diagram of an example configuration of a cell 305, nodes 310, 315, and 320, and servers 325, 330, 335, and 340, according to an embodiment of the invention. In an embodiment, each of the cell 305, the nodes 310, 315, and 320, and the servers 325, 330, 335, and 340 represents a java process and each includes an instance of the management bean 170. Any of the elements of FIG. 3 can be targeted for a configuration test.

The cell 305 may comprise multiple nodes on multiple machines, each of which has drivers for the database server 176. The cell 305 includes a datasource definition DS1 and an environment variable EV1=c:\sqllib. The datasource definition, e.g., DS1, identifies the datasource 172. The environment variable, e.g., EV1, identifies the location of the database driver jar file 174. In this example, the datasource 172 that is associated with the cell 305 may be found using the path specification "c:\sqllib."

For example, the cell 305, the node A 310, and the server1 325 processes may run on the same physical machine and all of them know the definition of the datasource DS1. A test run on the cell 305, the node A 310, or the server1 325 processes against the datasource DS1 makes use of the environment variable EV1 to locate the database driver 174. The same test performed on the node B 315 or the server2 330 looks for the database driver file 174 in the new location "d:\sqllib" since the environment variable EV1 is overridden by the specification in the node B 315.

The same test performed on the node C 320, the server3 335, or the server4 340 looks for the driver in /opt/sqllib because EV1 is redefined by the node C 320. The datasource DS2 is tested only in the node C 320, the server3 335, or the server4 340 using the environment variable EV2.

The configuration, data source definitions, and environment variables depicted in FIG. 3 is exemplary only, and any appropriate configuration, definitions, and variables may be used.

Figure 4:
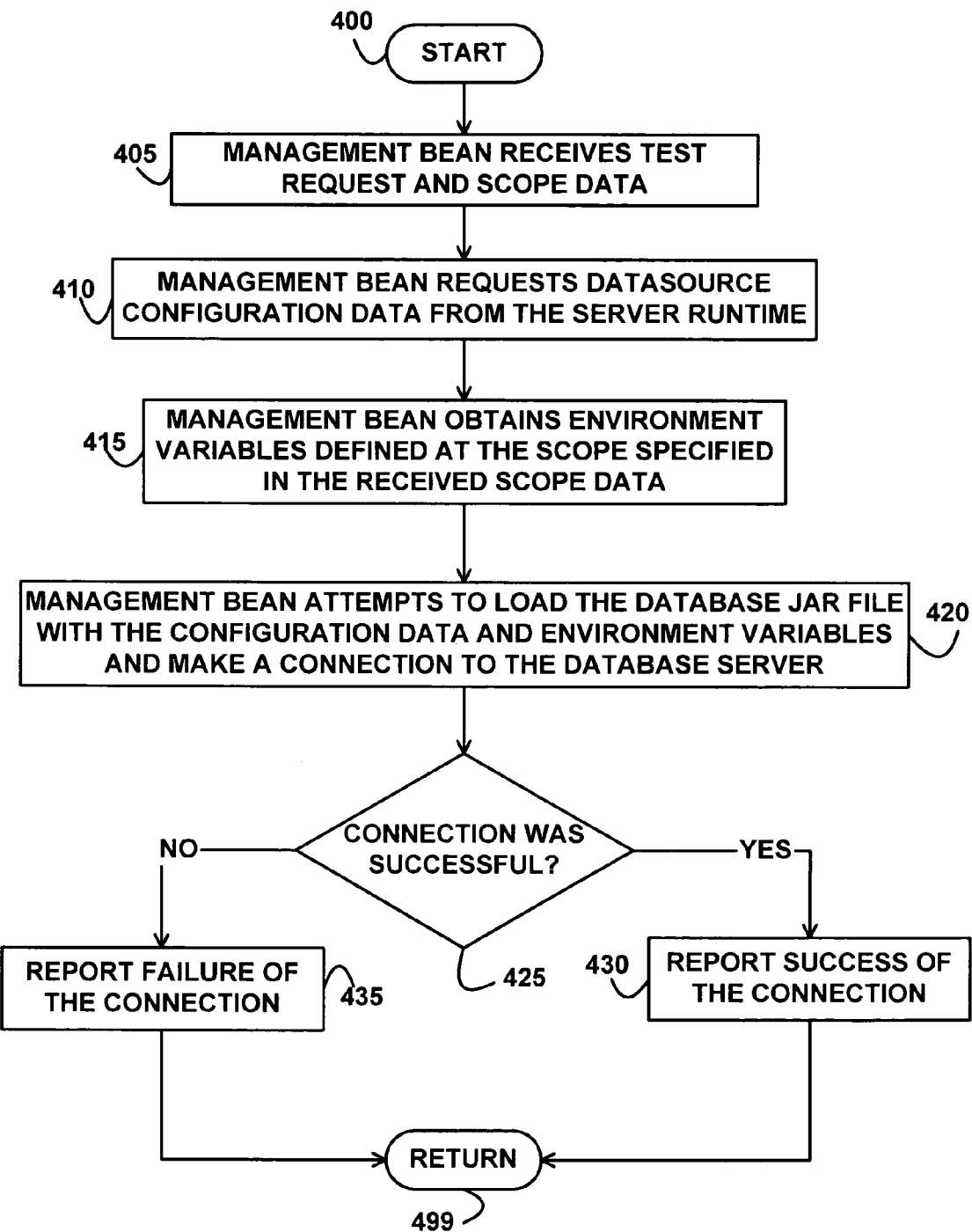
FIG. 4 depicts a flowchart of example processing for a management bean, according to an embodiment of the invention.

FIG. 4 depicts a flowchart of example processing for the management bean 170, according to an embodiment of the invention. Control begins at block 400. Control then continues to block 405 where the management bean 170 receives a test request and scope data. Examples of scope data include specifications of a cell-level scope, a node-level scope, and a server-level scope.

Control then continues to block 410 where the management bean 170 requests datasource configuration data from the server runtime that is associated with the received scope level. Using the example illustrated in FIG. 3, if the specified scope-level is cell, then the management bean 170 requests the contents of the datasource 172 using the datasource definition DS1, as specified in the cell 305. If the specified scope-level is node, then the management bean 170 requests the contents of the datasource 172 using the datasource definition defined at the node A 310, the node B 315, or the node C 320, depending on where the management bean 170 is located. If the specified scope-level is server, then the management bean 170 requests the contents for the datasource 172 using the datasource definition at the server 325, 330, 335, or 340, depending on where the management bean 170 is located. If no datasource definition is present at the received scope level, then the management bean 170 repeatedly searches the next scope levels until a datasource definition is found. For example, no datasource definition is present at the server1 325 and the node A 310, so if the received scope level is server or node, then the management bean 170 searches the configuration until the datasource definition is found at the cell 305.

Control then continues to block 415 where the management bean 170 obtains environment variables defined at the scope-level specified in the received scope data. Using the example illustrated in FIG. 3, if the specified scope-level is cell, then the management bean 170 requests the contents of the EV1 environment variable from the cell 305. If the specified scope-level is node, then the management bean 170 requests the contents of the environment variable defined at the node A 310, the node B 315, or the node C 320, depending on where the management bean 170 is located. If the specified scope-level is server, then the management bean 170 requests the contents for the environment variable defined at the server 325, 330, 335, or 340, depending on where the management bean 170 is located. If no environment variable is present at the received scope level, then the management bean 170 repeatedly searches the next scope levels until an environment variable is found. For example, no environment variable is present at the server1 325 and the node A 310, so if the received scope level is server or node, the management bean 170 searches the configuration until the environment variable EV1 is found at the cell 305.

Control then continues to block 420 where the management bean 170 attempts to load the database driver jar file 174 with the configuration data and environment variables, previously obtained as described at blocks 410 and 415, and make a connection to the database server 176.

Control then continues to block 425 where the management bean 170 determines whether the connection that was attempted at block 420 was successful. If the determination at block 425 is true, then the connection was successful, so control continues to block 430 where the management bean 170 reports success. Control then continues to block 499 where the logic of FIG. 4 returns.

If the determination at block 425 is false, then the connection was not successful, so control continues to block 435 where the management bean 170 reports failure of the connection. Control then continues to block 499 where the logic of FIG. 4 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A computer-implemented method comprising:
   receiving scope data, wherein the scope data specifies a received scope level;
   determining whether datasource configuration data exists at the received scope level;

if the datasource configuration data exists at the received scope level, finding the datasource configuration data at the received scope level;

if the datasource configuration data does not exist at the received scope level, finding the datasource configuration data that matches data at a next scope level;

finding an enviromnent variable based on the scope data; and loading a database driver with the datasource configuration data and the environment variable.

2. The method of claim 1, further comprising:

attempting a connection to a database server via the database driver.

3. The method of claim 1, wherein the finding the enviromnent variable further comprises:

determining whether the environment variable exists at the received scope level;

if the environment variable exists at the received scope level, finding the environment variable at the received scope level; and if the environment variable does not exist at the received scope level, finding the environment variable that matches a variable at a next scope level.

4. An apparatus comprising:

means for receiving scope data, wherein the scope data specifies a received scope level;

means for determining whether datasource configuration data exists at the received scope level;

means for finding the datasource configuration data at the received scope level if the datasource configuration data exists at the received scope level;

means for finding the datasource configuration data that matches data at a next scope level if the datasource configuration data does not exist at the received scope level;

means for finding an environment variable based on the scope data; and means for loading a database driver with the datasource configuration data and the environment variable; and means for attempting a connection to a database server via the database driver.

5. The apparatus of claim 4, wherein the means for finding the environment variable further comprises:

means for determining whether the environment variable exists at the received scope level;

means for finding the environment variable at the received scope level if the environment variable exists at the received scope level; and means for finding the environment variable that matches a variable at a next scope level if the environment variable does not exist at the received scope level.

6. The apparatus of claim 4, further comprising:

means for reporting success if the connection is successful.

7. The apparatus of claim 4, further comprising:

means for reporting failure if the connection fails.

8. A storage medium encoded with instructions, wherein the instructions when executed comprise:

receiving scope data, wherein the scope data specifies a received scope level;

determining whether datasource configuration data exists at the received scope level;

if the datasource configuration data exists at the received scope level, finding the datasource configuration data at the received scope level;

if the datasource configuration data does not exist at the received scope level, finding the datasource configuration data that matches data at a next scope level;

finding an environment variable based on the scope data;

loading a database driver with the datasource configuration data and the environment variable; and attempting a connection to a database server via the database driver.

9. The storage medium of claim 8, wherein the finding the environment variable further comprises:

determining whether the environment variable exists at the received scope level;

if the environment variable exists at the received scope level, finding the environment variable at the received scope level; and if the environment variable does not exist at the received scope level, finding the environment variable that matches a variable at a next scope level.

10. The storage medium of claim 8, further comprising:

reporting success if the connection is successful.

11. The storage medium of claim 8, further comprising:

reporting failure if the connection fails.

12. A computer system comprising:

a processor; and memory encoded with instructions, wherein the instructions when executed on the processor comprise:

receiving scope data, wherein the scope data specifies a received scope level;

determining whether datasource configuration data exists at the received scope level, if the datasource configuration data exists at the received scope level, finding the datasource configuration data at the received scope level, if the datasource configuration data does not exist at the received scope level, finding the datasource configuration data that matches data at a next scope level, finding an environment variable based on the scope data, loading a database driver with the datasource configuration data and the environment variable, attempting a connection to a database server via the database driver.

13. The computer system of claim 12, wherein the finding the environment variable further comprises:

determining whether the environment variable exists at the received scope level;

if the environment variable exists at the received scope level, finding the environment variable at the received scope level; and if the environment variable does not exist at the received scope level, finding the environment variable that matches a variable at a next scope level.

14. The computer system of claim 12, wherein the instructions further comprise:

reporting success if the connection is successful.

15. The computer system of claim 12, wherein the instructions further comprise:

reporting failure if the connection fails.

16. A method of configuring a computer to perform the method comprising:

configuring the computer to receive scope data, wherein the scope data specifies a received scope level;

configuring the computer to determine whether datasource configuration data exists at the received scope level;

configuring the computer to find the datasource configuration data at the received scope level if the datasource configuration data exists at the received scope level;

configuring the computer to find the datasource configuration data that matches data at a next scope level if the datasource configuration data does not exist at the received scope level;

configuring the computer to find an environment variable based on the scope data; and configuring the computer to load a database driver with the datasource configuration data and the environment variable.

17. The method of claim 16, further comprising:
configuring the computer to attempt a connection to a database server via the database driver.

18. The method of claim 16, wherein the configuring the computer to find the environment variable further comprises:

configuring the computer to determine whether the environment variable exists at the received scope level;

configuring the computer to find the environment variable at the received scope level if the environment variable exists at the received scope level; and configuring the computer to find the environment variable that matches a variable at a next scope level if the environment variable does not exist at the received scope level.

19. The method of claim 16, wherein the method further comprises:
configuring the computer to report success if the connection is successful.

* * * * *